S. L. SIMPSON.
VEHICLE WHEEL TIRE AND RIM.
APPLICATION FILED OCT. 19, 1909.

974,713.

Patented Nov. 1, 1910.

Fig. 1

Fig. 2

Witnesses

Inventor
S. L. Simpson.
By Franklin W. Hough
Attorney

UNITED STATES PATENT OFFICE.

SELDEN L. SIMPSON, OF CLEVELAND, OHIO, ASSIGNOR TO THE SIMPSON SPECIALTY COMPANY, OF CLEVELAND, OHIO, A CORPORATION OF OHIO.

VEHICLE-WHEEL TIRE AND RIM.

974,713.            Specification of Letters Patent.      Patented Nov. 1, 1910.

Application filed October 19, 1909. Serial No. 523,530.

*To all whom it may concern:*

Be it known that I, SELDEN L. SIMPSON, a citizen of the United States, residing at Cleveland, in the county of Cuyahoga and State of Ohio, have invented certain new and useful Improvements in Vehicle-Wheel Tires and Rims; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in vehicle wheels and particularly to a novel construction of securing a tire to the rim of a wheel.

The invention comprises various details of construction and combinations and arrangements of parts which will be hereinafter fully described and then specifically defined in the appended claim.

I illustrate my invention in the accompanying drawings, in which:—

Figure 1 is a sectional view through a tire and clamping plates forming a part of my invention, and Fig. 2 is a detail perspective view.

Reference now being had to the details of the drawings by numerals, 18 designates the felly of a wheel provided with spokes 9 and, in Fig. 1 of the drawings, I have shown the outer end of one of the spokes as being contracted as at 10 to receive a ferrule 11 and said ferrule is provided with threads adapted to receive a nut 12. A clamping plate 2 is provided with threaded apertures 13 for the reception of the threaded end of the ferrule and said clamping plate is provided with inwardly turned marginal edges 3.

5 designates a tire made up of any suitable material, preferably Manila fiber, combined with tar, asphalt, etc., and through which reinforcing wires 6 are passed. The inwardly turned marginal edges 3 of said plate clamp the tire at positions diametrically opposite, forming the indentures 4 in the tire to securely hold the same in place, and bolts 7 are passed through parallel portions of the plates 2 and, by tightening the nuts 8, said plates may be held against the marginal edges of the felly and also the tire.

By the provision of the foregoing, it will be noted that a simple and efficient means is afforded for securely holding a tire upon the rim of a wheel.

What I claim to be new is:—

In combination with the felly of a wheel having a rim, the opposite edges of which project beyond the opposite edges of the felly, clamping plates having wings struck up therefrom and curved and adapted to engage underneath the projecting portions of the rim, portions of the plates engaging the circumference of the rim, a tire in contact with portions of said plates, inwardly extending wings upon said plates engaging the tire at positions diametrically opposite, the outer marginal edges of the plates provided with apertures, and bolts passing through said plates and adapted to hold the same in clamping relation against the tire and rim.

In testimony whereof I hereunto affix my signature in the presence of two witnesses.

. SELDEN L. SIMPSON.

Witnesses:
    JACOBEN WOLENSKI,
    MICHAEL SCHAFFER.